(12) United States Patent
Fukaya

(10) Patent No.: US 8,755,085 B2
(45) Date of Patent: Jun. 17, 2014

(54) IMAGE FORMING APPARATUS FOR FORMING COLOR IMAGE HAVING TINT EASY TO SEE FOR USER

(75) Inventor: Hideaki Fukaya, Shizuoka (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 122 days.

(21) Appl. No.: 13/432,926

(22) Filed: Mar. 28, 2012

(65) Prior Publication Data
US 2012/0257225 A1    Oct. 11, 2012

Related U.S. Application Data

(60) Provisional application No. 61/472,162, filed on Apr. 5, 2011.

(51) Int. Cl.
*H04N 1/60* (2006.01)

(52) U.S. Cl.
USPC .......................... 358/1.9; 358/1.15; 345/594

(58) Field of Classification Search
USPC ............... 358/1.2, 1.9, 1.13, 1.15, 1.18, 537; 382/309, 311; 345/581, 589, 593, 594, 345/600, 619; 715/200, 202, 204, 255, 274, 715/275, 700
See application file for complete search history.

(56) References Cited

U.S. PATENT DOCUMENTS

| | | | | |
|---|---|---|---|---|
| 6,786,659 | B1* | 9/2004 | Katayama et al. | 358/1.9 |
| 7,120,634 | B2* | 10/2006 | Jecha et al. | 715/202 |
| 2006/0290958 | A1* | 12/2006 | Jang et al. | 358/1.9 |
| 2007/0035746 | A1* | 2/2007 | Jecha et al. | 358/1.1 |
| 2008/0010075 | A1* | 1/2008 | Moody | 705/1 |
| 2008/0316223 | A1* | 12/2008 | Fujinaga | 345/589 |
| 2010/0123911 | A1* | 5/2010 | Guay | 358/1.9 |
| 2010/0149562 | A1* | 6/2010 | Park et al. | 358/1.9 |
| 2013/0094062 | A1* | 4/2013 | Park et al. | 358/3.23 |

FOREIGN PATENT DOCUMENTS

JP    2010-272910    12/2010

* cited by examiner

*Primary Examiner* — Kimberly A Williams
(74) *Attorney, Agent, or Firm* — Patterson & Sheridan, L.L.P.

(57) ABSTRACT

An image forming apparatus includes: a display section to display plural patterns having the same shape and different tints on the same screen; a selecting section which a user selects a desired pattern from the plural patterns displayed on the display section; a determining section which the user inputs a determination concerning whether the desired pattern selected with the selecting section is suitable; and a control section to set, according to the input to the determining section, a tint of a toner image formed by an image forming section.

20 Claims, 9 Drawing Sheets

FIG. 5

The image shown on the next screen includes the three bar graphs, the mark of the powder room, and the mark of the tennis racket.

After pressing the button "To Next Screen", please select the type 1 or the type 2 as a figure easy to see (a favorite tint or a tint with which a mark is easily determined).

If you call registered setting of an adjusted tint and perform printing, please press the button "To Call Screen".

If you do not adjust a tint, please press the button "Print as it is".

| TO NEXT SCREEN | TO CALL SCREEN | PRINT AS IT IS |

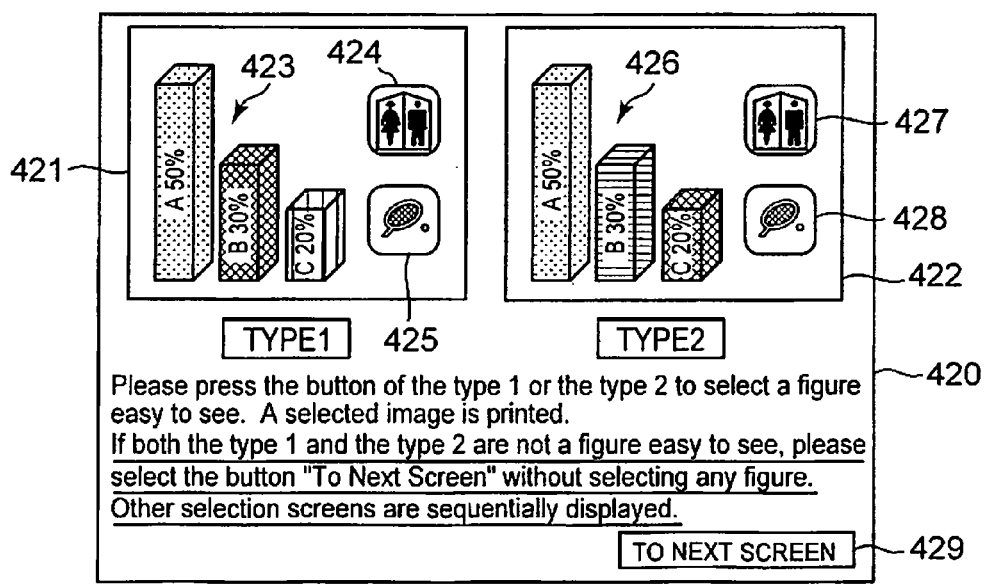

IMAGE FORMING APPARATUS FOR FORMING COLOR IMAGE HAVING TINT EASY TO SEE FOR USER

CROSS-REFERENCE TO RELATED APPLICATION

This application is based upon and claims the benefit of priority from Provisional U.S. Application 61/472,162 filed on Apr. 5, 2011 the entire contents of which are incorporated herein by reference.

FIELD

Embodiments described herein relate generally to an image forming apparatus that obtains, according to color sense characteristics of a user, a color image output having a tint easy to see for the user.

BACKGROUND

As an image forming apparatus such as a color copying machine or a color printer, there is an apparatus that converts plural colors determined as difficult for color weakness people, who have color sense characteristics different from a general color sense, to distinguish into the same colors in a color space of data for image formation. However, the color sense characteristics of the color weakness people are not uniform and are different for the respective color weakness people. Therefore, simply by converting the specific plural colors determined as difficult to distinguish into the same colors, images having tints easy to see for the color weakness people are not always obtained according to the color sense characteristics of the respective color weakness people. Further, it is likely that images having tints corresponding to tastes of the respective color weakness people are not obtained.

BRIEF DESCRIPTION OF THE DRAWINGS

FIG. 5 is a diagram for explaining a selection instruction screen (of a display screen) according to the first embodiment;

FIG. 6 is a diagram for explaining a selection screen (of the display screen) according to the first embodiment;

DETAILED DESCRIPTION

According to one embodiment, an image forming apparatus includes: a display section to display plural patterns having the same shape and different tints on the same screen; a selecting section which a user selects a desired pattern from the plural patterns displayed on the display section; a determining section which the user inputs a determination concerning whether the desired pattern selected with the selecting section is suitable; and a control section to set, according to the input to the determining section, a tint of a toner image formed by an image forming section.

Embodiments are explained below.

First Embodiment

Figure 1:
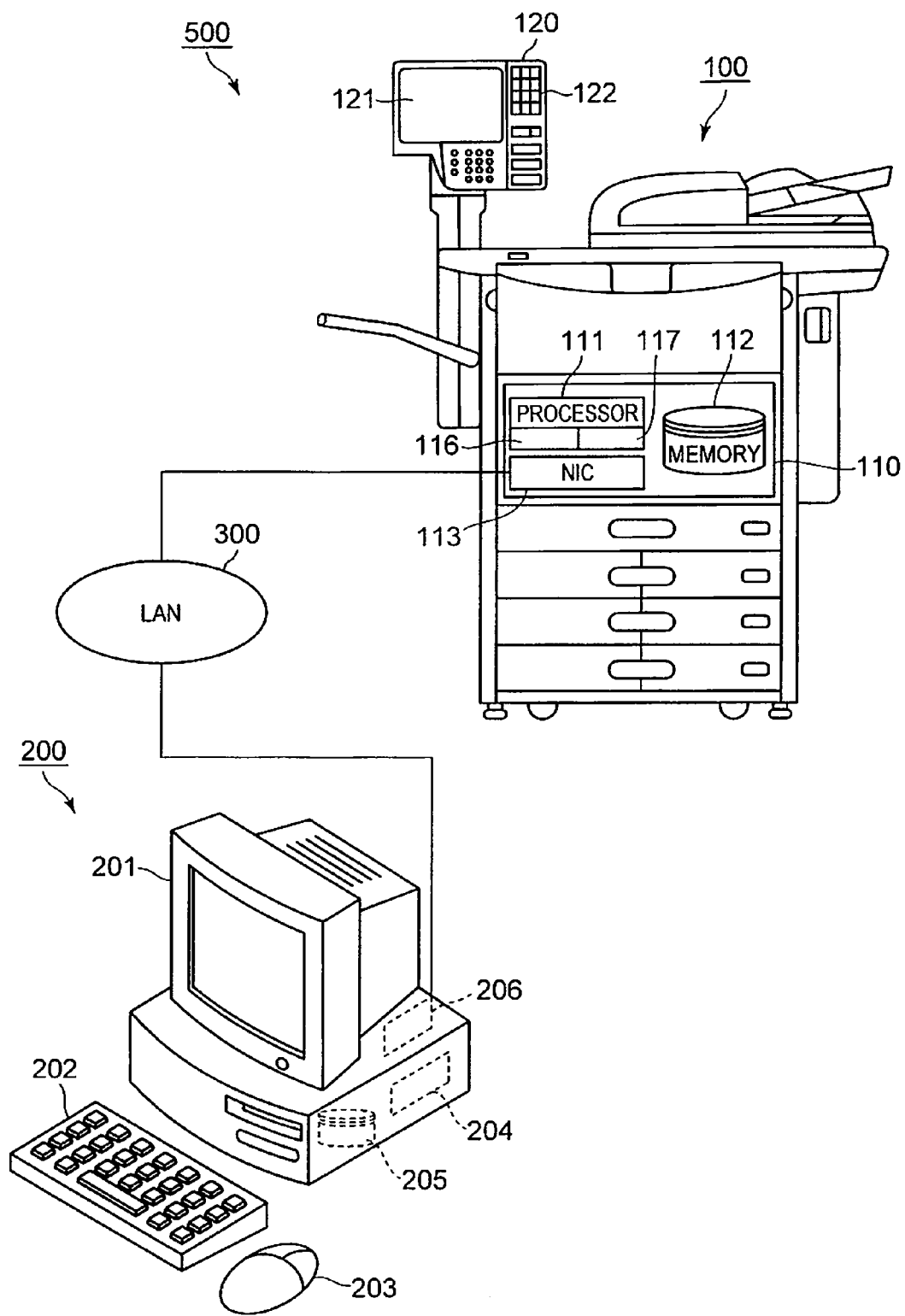
FIG. 1 is a schematic configuration diagram of an image forming system according to a first embodiment.

FIG. 1 is a diagram of an image forming system 500 according to a first embodiment. The image forming system 500 includes a color MFP (Multi Function Peripheral) 100, which is an image forming apparatus, and a client PC 200. A LAN (Local Area Network) 300 connects the MFP 100 and the client PC 200. The MFP 100 and the client PC 200 respectively include communication functions and communicate with each other.

A control board 110 in the MFP 100 includes a processor 111, which is a control section, a memory 112, and a NIC (Network Interface Card) 113. The processor 111 includes a CPU 116 and a control circuit 117 that control the entire MFP 100. The memory 112 includes, for example, a RAM (Random Access Memory), a ROM (Read Only Memory), and a HDD (Hard disk drive). The NIC 113 controls communication with the outside. The MFP 100 includes a control panel 120, which is a display section, a selecting section, a determining section, or an adjusting section. The control panel 120 includes, for example, a keyboard 122 that receives an input by a user and a touch panel display 121 that receives an input by the user or performs display to the user.

The client PC 200 includes a processor 204, a memory 205, and a NIC (Network Interface Card) 206. The memory 205 includes, for example, a RAM (Random Access Memory), a ROM (Read Only Memory), and a HDD (Hard disk drive). The client PC 200 includes, for example, a keyboard 202 that receives an input from the user, a mouse 203, and a monitor 201 that displays control contents and the like to the user. The client PC 200 may be, for example, a personal computer. The NIC 113 and the NIC 206 perform communication control each other via the LAN 300.

The MFP 100 includes a copy function, a printer function, a scanner function, a facsimile function, and a network communication function. For example, the MFP 100 functions as a network printer and executes printing requested from the client PC 200.

Figure 2:
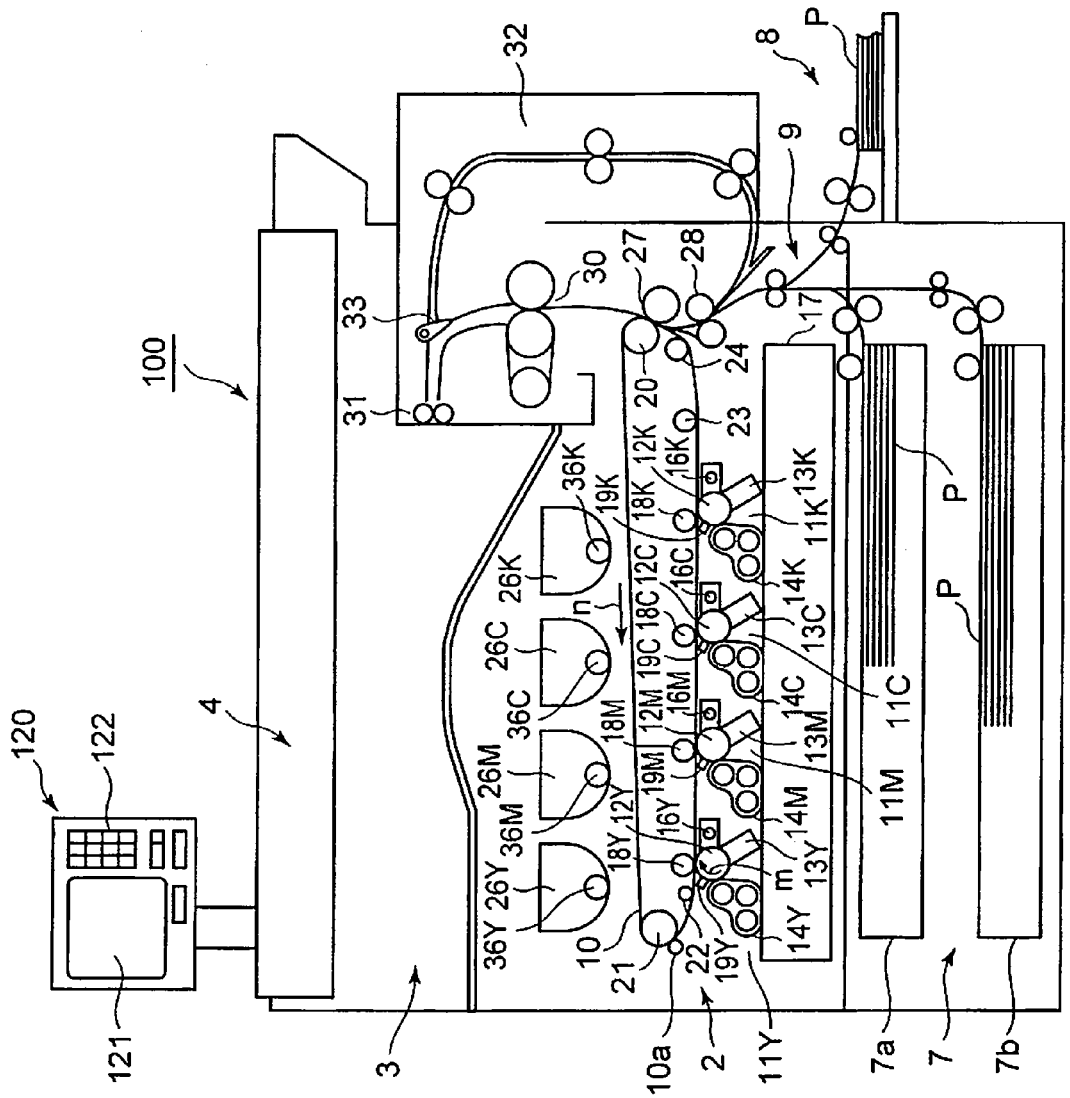
FIG. 2 is a schematic configuration diagram of an MFP according to the first embodiment.

The configuration of the MFP 100 is explained. As shown in FIG. 2, the MFP 100 includes, for example, a printer section 2, which is an image forming section that forms an image, a paper discharge section 3 that accumulates sheets P discharged from the printer section 2, a scanner section 4 that reads a document image, and a paper feeding device 7 and a manual paper feeding device 8 that feed the sheets P.

The printer section 2 includes four image forming stations 11Y, 11M, 11C, and 11K for Y (yellow), M (magenta), C (cyan), and K (black) arranged in parallel along the lower side of a transfer belt 10. The image forming stations 11Y, 11M, 11C, and 11K respectively include photoconductive drums 12Y, 12M, 12C, and 12K, which are image bearing members. The image forming stations 11Y, 11M, 11C, and 11K respectively form toner images of Y (yellow), M (magenta), C (cyan), and K (black) on the photoconductive drums 12Y, 12M, 12C, and 12K.

The image forming stations 11Y, 11M, 11C, and 11K respectively include, around the photoconductive drums 12Y, 12M, 12C, and 12K rotating in an arrow m direction, chargers 13Y, 13M, 13C, and 13K, developing devices 14Y, 14M, 14C, and 14K, photoconductive member cleaners 16Y, 16M, 16C, and 16K, and drum thermistors 19Y, 19M, 19C, and 19K.

A laser exposing device 17 irradiates exposure lights corresponding to the respective colors to sections extending from the chargers 13Y, 13M, 13C, and 13K to the developing devices 14Y, 14M, 14C, and 14K around the photoconductive drums 12Y, 12M, 12C, and 12K. The irradiation of the exposure lights from the laser exposing device 17 forms electrostatic latent images on the photoconductive drums 12Y, 12M, 12C, and 12K.

The developing devices 14Y, 14M, 14C, and 14K respectively supply toners to the electrostatic latent images on the photoconductive drums 12Y, 12M, 12C, and 12K and visualize the electrostatic latent images. The developing devices 14Y, 14M, 14C, and 14K respectively develop the electrostatic latent images using two-component developers including toners of C (cyan), (magenta), Y (yellow), and K (black) and a carrier.

The printer section 2 includes, above the developing devices 14Y, 14M, 14C, and 14K, toner cartridges 26Y, 26M, 26C, and 26K that respectively store the toners, which are developers, of C (cyan), M (magenta), Y (yellow), and K (black) supplied to the developing devices 14Y, 14M, 14C, and 14K. The toner cartridges 26Y, 26M, 26C, and 26K include toner augers 36Y, 36M, 36C, and 36K that convey the toners in the directions of the developing devices 14Y, 14M, 14C, and 14K.

The transfer belt 10 is stretched and suspended among a backup roller 20, a driven roller 21, and first to third tension rollers 22 to 24 and rotates in an arrow n direction. The transfer belt 10 is opposed to and in contact with the photoconductive drums 12Y, 12M, 12C, and 12K. The printer 2 includes primary transfer rollers 18Y, 18M, 18C, and 18K in positions opposed to the photoconductive drums 12Y, 12M, 12C, and 12K via the transfer belt 10. The primary transfer rollers 18Y, 18M, 18C, and 18K respectively primarily transfer toner images formed on the photoconductive drums 12Y, 12M, 12C, and 12K onto the transfer belt 10. The photoconductive member cleaners 16Y, 16M, 16C, and 16K respectively remove and collect residual toners on the photoconductive drums 12Y, 12M, 12C, and 12K after the primary transfer.

A secondary transfer roller 27 is opposed to a secondary transfer section of the transfer belt 10 supported by the backup roller 20. In the secondary transfer section, a predetermined secondary transfer bias is applied between the backup roller 20 and the secondary transfer roller 27. In the secondary transfer section, the toner images on the transfer belt 10 are collectively secondarily transferred onto the sheet P passing between the transfer belt 10 and the secondary transfer roller 27. A paper feeding cassette 7*a* or 7*b* of the paper feeding device or the manual paper feeding device 8 feeds, with a conveying section 9, the sheet P to between the transfer belt 10 and the secondary transfer roller 27 via a registration roller pair. A belt cleaner 10*a* cleans the transfer belt 10 after the end of the secondary transfer.

The printer section 2 includes a fixing device 30 further downstream than the secondary transfer roller 27 along a conveying direction of the sheet P. The fixing device 30 fixes the toner images, which are secondarily transferred onto the sheet P from the transfer belt 10, on the sheet P. The printer section 2 includes, downstream of the fixing device 30, a gate 33 that diverts the sheet P in the direction of a paper discharge roller 31 or the direction of a re-conveying unit 32. The paper discharge roller 31 discharges the sheet P to the paper discharge section 3. The re-conveying unit 32 leads the sheet P in the direction of the secondary transfer roller 27 again.

With the components explained above, if print operation is started, the MFP 100 transfers an image formed by the printer section 2 onto the sheet P, which is a recording medium, fed from the paper feeding device or the manual paper feeding device 8, fixes the image on the sheet P, and discharges the sheet P to the paper discharge section 3. The MFP 100 is not limited to a tandem system. The number of developing devices is not limited either. The MFP 100 may directly transfer the toner images from photoconductive members onto a sheet.

Image processing by the MFP 100 corresponding to color sense characteristics of the user or a taste of the user is explained in detail. The color sense characteristics are classified into, for example, five types: color sense characteristics of C type (general) color sense people to which more than 90% of Japanese people belong, color sense characteristics of P type color weakness people who have trouble of sensing red light, color sense characteristics of D type color weakness people who have trouble of sensing green light, color sense characteristics of T type color weakness people who have trouble of sensing blue light, and color sense characteristics of A type color weakness people who have trouble of distinguishing most t colors (according to "Color Universal Design Organization").

Figure 3:
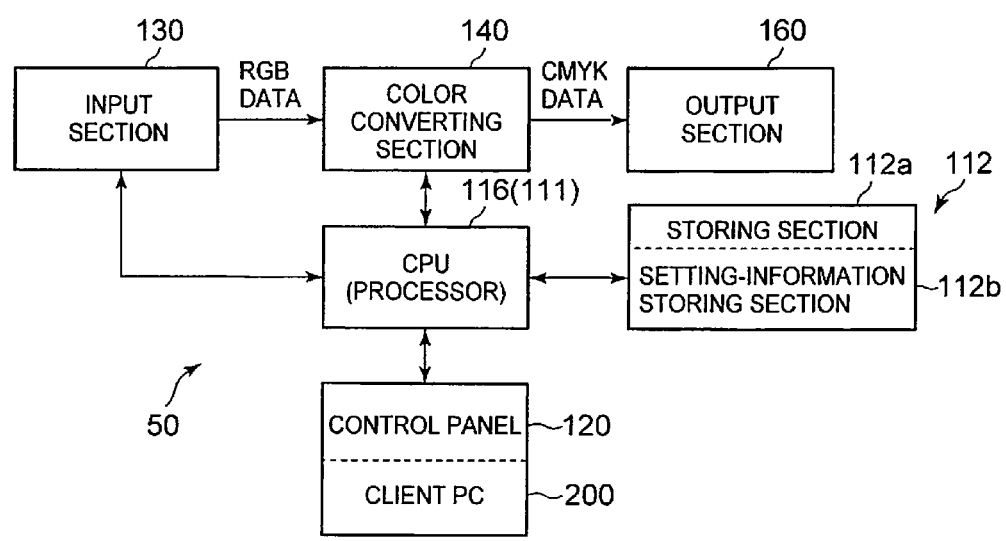
FIG. 3 is a schematic block diagram of a control system that mainly performs control for a change to a tint easy to see for a user of the MFP according to the first embodiment.

A control system 50 shown in FIG. 3 performs image control for the printer section 2. The CPU 116 of the MFP 100 controls the control system 50. The CPU 116 is connected to the control panel 120 or the client PC 200, an input section 130, a color converting section 140, and the memory 112.

The CPU 116 performs arithmetic processing for the color converting section 140 using information of the memory 112. The input section 130 input a data read by the scanner section 4 and requested to be subjected to image processing and a data transmitted from the client PC 200 via the LAN 300 and requested to be subjected to the image processing.

The color converting section 140 converts RGB data input from the input section 130 into CMYK data treated by the printer section 2. The color converting section 140 converts, according to the user, the RGB data into peculiar CMYK data easy to see for the user. The color converting section 140 outputs the converted CMYK data to the printer section 2 via an output section 160. The MFP 100 prints a target image on the sheet P using the CMYK data output from the output section 160.

The memory 112 stores all types of information necessary in the MFP 100. The memory 112 includes a storing section 112*a* including an EEPROM not erased even if a power supply is turned off and a setting-information storing section 112*b* including a SRAM for data storage. The setting-information storing section 112*b* can store, together with user authentication data, the peculiar CMYK data easy to see for the user converted by the color converting section 140. The user reuses the CMYK data stored in the setting-information storing section 112b. The user can store the peculiar CMYK data easy to see for the user converted by the color converting section 140 in, for example, an external storing section as well.

If the peculiar CMYK data easy to see for the user, which is the same as the CMYK data stored in the setting-information storing section 112b, is stored in the storing section 112a not erased even if the power supply for the MFP 100 is turned off, it is also possible to call and use the peculiar CMYK data without using an external storage in resetting the MFP 100.

Figure 4:
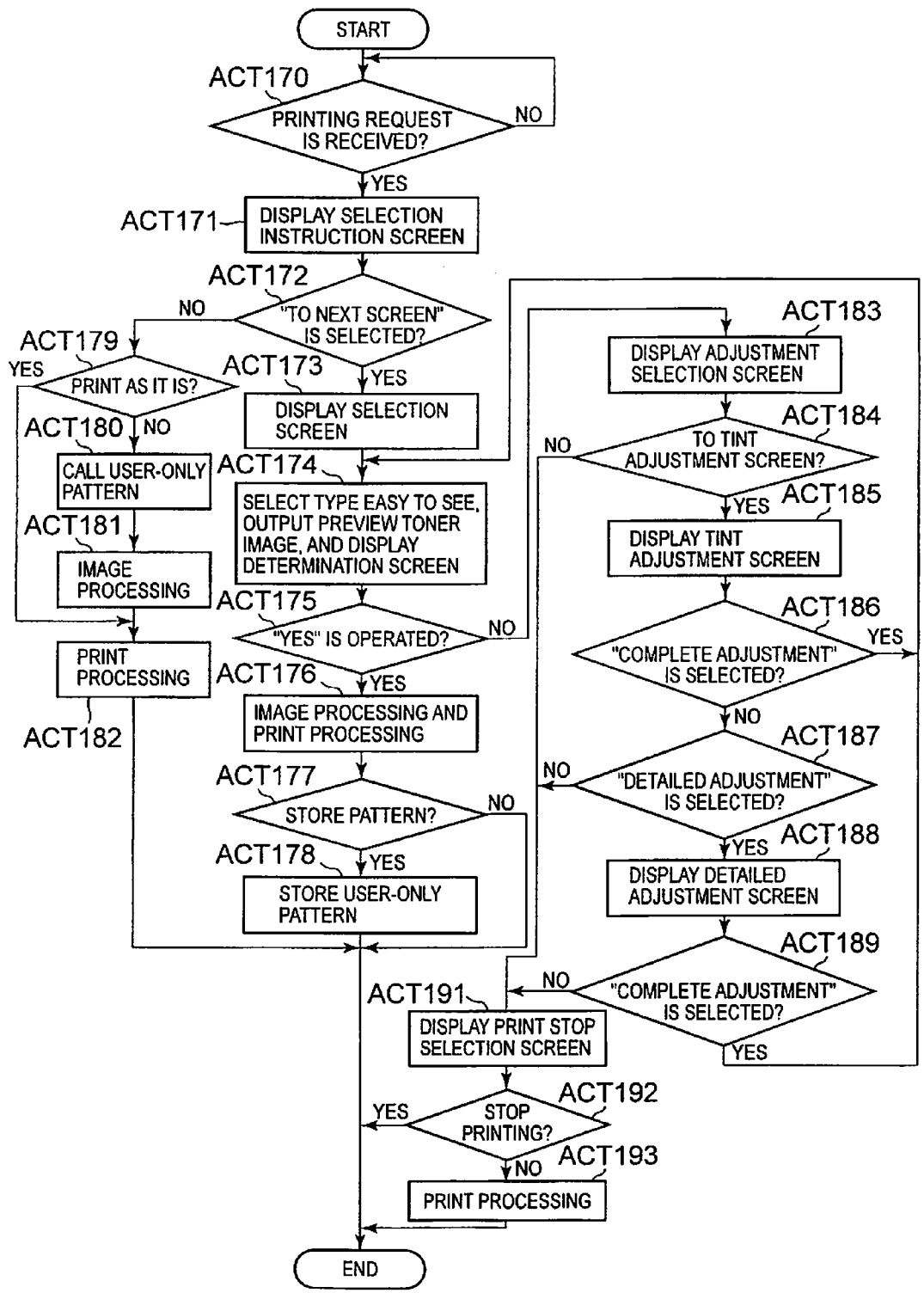
FIG. 4 is a flowchart for explaining image processing before execution of printing according to the first embodiment.

If a printing request is received, the MFP 100 performs peculiar image processing for changing a tint to a tint easy to see for the user before print execution. As shown in FIG. 4, if a printing request is received from the control panel 120, the client PC 200, or the like (Yes in ACT 170), the MFP 100 displays, on the touch panel display 121 or the monitor 201 (hereinafter abbreviated as "display screen"), a selection instruction screen 410 shown in FIG. 5 for selecting a tint easy to see for the user (ACT 171).

The selection instruction screen 410 is, for example, a screen that indicates to the user what kind of output screen is output and informs the user of a selection instruction indicating under what kind of determination criteria the user is requested to select a favorite tint, a tint with which a mark is easily seen, or an output of a color image.

If the user does not yet store a pattern having a tint matching color sense characteristics or a taste of the user in the setting-information storing section 112b or the external storing section and if tint adjustment is necessary, the user selects, on the selection instruction screen 410, "To Next Screen" 411 for transitioning to the next screen (Yes in ACT 172). According to the selection of the "To Next Screen" 411, the display screen displays a selection screen 420 shown in FIG. 6 (ACT 173).

If the user already stores a pattern having a tint matching color sense characteristics or a taste of the user in the setting-information storing section 112b or the external storing section, the user selects "To Call Screen" 412 (No in ACT 172 and No in ACT 179). If the user does not store a pattern having a tint matching color sense characteristics or a taste of the user and if tint adjustment is unnecessary, the user selects "Print as it is" 413 on the selection instruction screen 410 (Yes in ACT 179). The MFP 100 directly applies print processing to a job requested to be printed without performing the tint adjustment (ACT 182) and ends the printing operation.

The selection screen 420 displays plural patterns for each image of tints of a print actually output. The plural patterns for each image of tints of a print actually output are, for example, "a pattern having a tint easy to see for the C type color sense people", "patterns having tints easy to see for people having high degrees of color weakness of the P type color weakness people, the D type color weakness people, and the T type color weakness people", and "patterns having tints easy to see for people having low degrees of color weakness of the P type color weakness people, the D type color weakness people, and the T type color weakness people". All the patterns have the same shape and have different tints according to respective color sense characteristics of the people.

The selection screen 420 displays, for comparison, two patterns, for example, "type 1" 421 and "type 2" 422 among all the patterns. The "type 1" 421 of the selection screen 420 is a pattern including three types of bar graphs 423, a mark 424 of a powder room, and a mark 425 of a tennis racket. The "type 2" 422 is a pattern including three types of bar graphs 426, a mark 427 of a powder room, and a mark 428 of a tennis racket having a tint different from a tint of the "type 1" 421.

For example, the pattern of the "type 1" 421 is changed to a tint easy to see for the C type color sense people and the pattern of the "type 2" 422 is changed to a tint easy to see for the people having a high degree of color weakness of the P type color weakness people. For example, a tint of the three types of bar graphs 423 of the "type 1" 421 is changed to two patterns to make it possible to select tints easy to see for the people having a high degree of color weakness and the people having a low degree of color weakness of the P type color weakness people. A tint of the mark 424 of a powder room of the "type 1" 421 is changed to two patterns to make it possible to select tints easy to see for the people having a high degree of color weakness and the people having a low degree of color weakness of the D type color weakness people. A tint of the mark 425 of a tennis racket of the "type 1" 421 is changed to two patterns to make it possible to select tints easy to see for the people having a high degree of color weakness and the people having a low degree of color weakness of the P type color weakness people.

Images of a print output to the selection screen 420 may be, for example, three or more types. On the selection screen 420, the user selects a pattern having a tint easy to see for the user matching color sense characteristics of the user (ACT 174). If it is difficult to distinguish the color sense characteristics of the user with both the two patterns of the "type 1" 421 and the "type 2" 422, the user selects "To Next Screen" 429. If the "To Next Screen" 429 is selected, the next two patterns selected by the user anew are displayed on the selection screen 420. The next two patterns are a pattern having a tint easy to see for the people having a low degree of color weakness of the P type color weakness people and a pattern having a tint easy to see for the people having a high degree of color weakness of the D type color weakness people. If the user sequentially selects the "To Next Screen" 429 on the selection screen 420, the selection screen 420 sequentially displays other patterns having tints easy to see for the user matching the color sense characteristics.

A way of display of patterns on the selection screen 420 according to the selection of the "To Next Screen" 429 is not limited. For example, the "type 1" 421 and other patterns having tints easy to see for the user matching the color sense characteristics may be always displayed.

Figure 7:
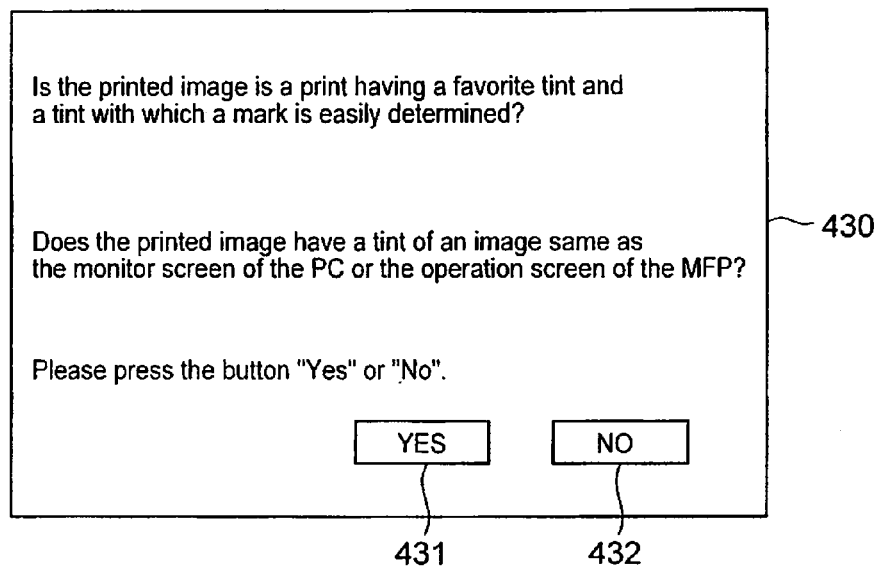
FIG. 7 is a diagram for explaining a determination screen (of the display screen) according to the first embodiment.

If the user selects, on the selection screen 420, a pattern of any one of the types easy to see for the user, the MFP 100 outputs a preview toner image and the display screen displays a determination screen 430 shown in FIG. 7 (ACT 174). The preview toner image is a print on which a pattern is actually printed. The MFP 100 prints the preview toner image with CMYK data converted by the color converting section 140 such that a tint of the pattern is the type selected by the user.

The determination screen 430 is a screen on which the user determines whether the preview toner image has a tint assumed by the user and inputs a determination result. If the user determines that the preview toner image has the tint assumed by the user and operates "Yes" 431 of the determination screen 430 (Yes in ACT 175), the MFP 100 applies image processing based on the tint of the type selected by the user to the job requested to be printed and performs print processing (ACT 176).

If the MFP 100 stores a user-only pattern easy to see for the user in a memory or the like after the print processing (Yes in ACT 177), the MFP 100 stores the user-only pattern in the setting-information storing section 112b in association with a user ID for authenticating the user (ACT 178) and ends the print processing with a tint corresponding to the color sense characteristics of the user or the taste of the user. The user-only pattern can be stored in, for example, an external storing section of a user memory or the like such as a HDD in the client PC 200. If the user-only pattern is not stored in ACT 177 (No in ACT 177), the MFP 100 ends the print processing without storing the user-only pattern.

If the user-only pattern is stored in the setting-information storing section 112b, and if another printing request is received thereafter, it is possible to call the user-only pattern and perform printing processing. If the user authentication is performed and the user can be specified, the user selects the "To Call Screen" 412 of the selection instruction screen 410 (No in ACT 179) and calls the user-only pattern stored in the setting-information storing section 112b (ACT 180). Alternatively, the user calls the user-only pattern from a user memory managed by the user. The MFP 100 applies image processing based on the user-only pattern stored in the setting-information storing section 112b to the job requested to be printed (ACT 181), performs the print processing (ACT 182), and ends the printing operation.

If the user-only pattern stored in the setting-information storing section 112b, the user memory, or the like is called and the print processing is performed, the user can save labor and time for setting a pattern easy to see for the user. Authentication in calling the user-only pattern is not limited to a specific individual. An operator having authority may call the user-only pattern using a common user ID.

Figure 8:
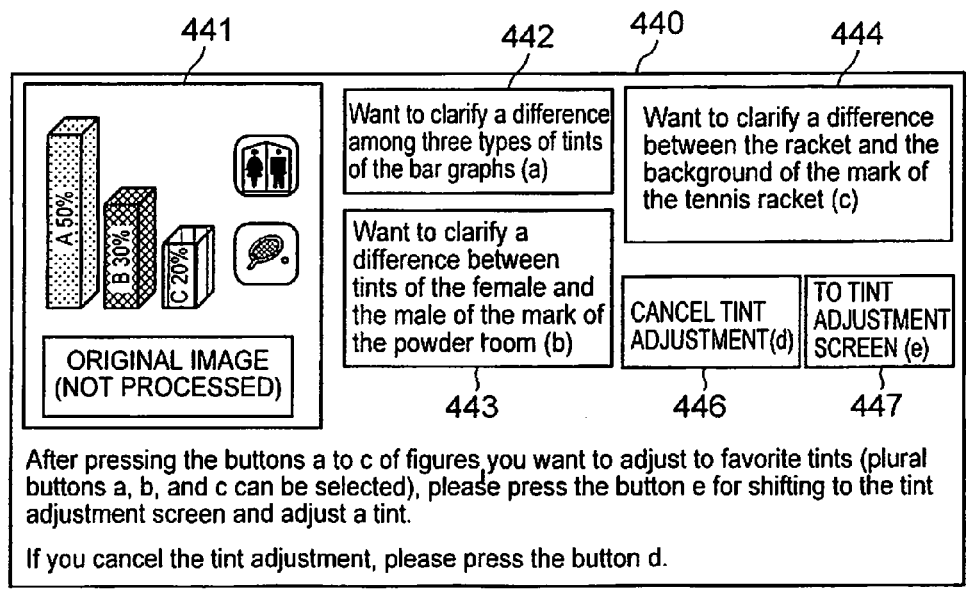
FIG. 8 is a diagram for explaining an adjustment selection screen (of the display screen) according to the first embodiment.

If the preview toner image output in ACT 174 is different from the tint assumed by the user, the user operates "No" 432 of the determination screen 430 (No in ACT 175). The display screen displays an adjustment selection screen 440 shown in FIG. 8 (ACT 183).

The adjustment selection screen 440 displays an original image (not processed) 441 of bar graphs, a mark of a powder room, and a mark of a tennis racket, "Want to clarify a difference among three types of tints of the bar graphs (a)" 442, "Want to clarify a different between tints of the female and the male of the mark of the powder room (b)" 443, "Want to clarify a difference between the racket and the background of the mark of the tennis racket (c)" 444, "Cancel Tint Adjustment (d)" 446, and "To Tint Adjustment Screen (e)" 447.

Figure 9:
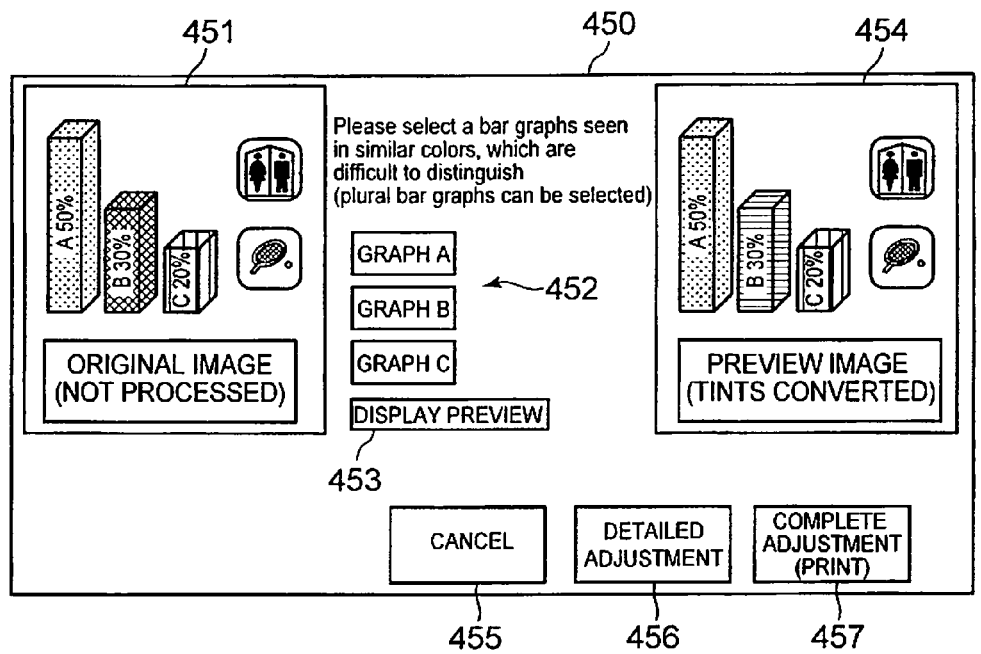
FIG. 9 is a diagram for explaining a tint adjustment screen (of the display screen) according to the first embodiment.

The user arbitrarily selects an item for which the user wants to clarify a difference between tints and further selects the "To Tint Adjustment Screen (e)" 447 on the adjustment selection screen 440. For example, after selecting the "Want to clarify a difference among three types of tints of the bar graphs (a)" 442, if the user select the "To Tint Adjustment Screen (e)" 447 (Yes in ACT 184), the display screen displays a tint adjustment screen 450 shown in FIG. 9 (ACT 185).

Figure 11:
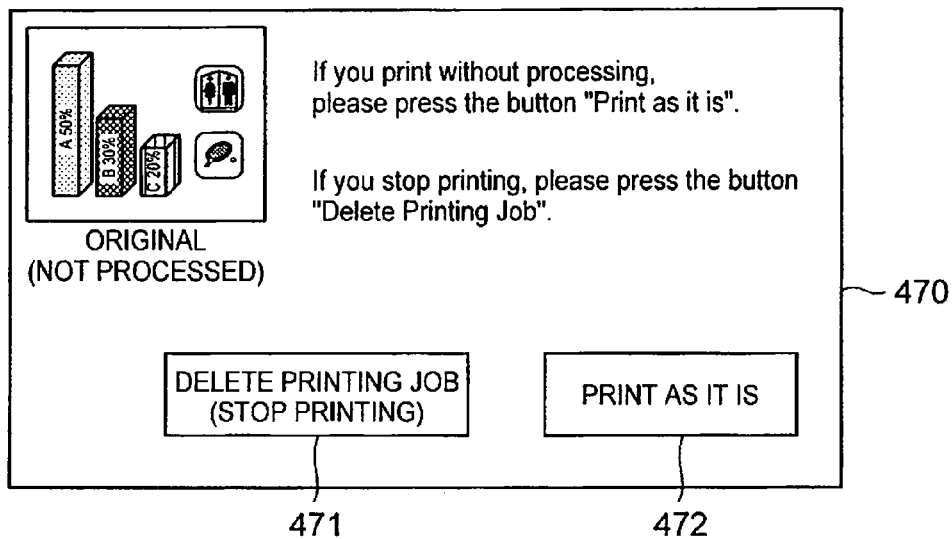
FIG. 11 is a diagram for explaining a screen for selecting stop of printing (of the display screen) according to the first embodiment.

If the user does not desire further adjustment of a tint, the user selects the "Cancel Tint Adjustment (d)" 446 (No in ACT 184). The display screen displays a printing stop selection screen 470 shown in FIG. 11 (ACT 191). If the user does not need tint adjustment and if the user executes printing, the user selects "Print as it is" 472 on the printing stop selection screen 470 (No in ACT 192). The MFP 100 directly applies the print processing to the job requested to be printed without performing tint adjustment (ACT 192) and ends the printing operation. If the user stops printing, the user selects "Delete Print Job (Stop Printing)" 471 on the printing stop selection screen 470 (Yes in ACT 192) and ends the job requested to be printed.

The tint adjustment screen 450 displays "Original Image (not processed) 451, "partial selection key" 452, "Display Preview" 453, "Preview Pattern" 454, "Cancel" 455, "Detailed Adjustment" 456, and "Complete Adjustment (Print)" 457. If the user selects the "Want to clarify a difference between tints of the female and the male of the mark of the powder room (b)" 443 or the "Want to clarify a difference between the racket and the background of the mark of the tennis racket (c)" 444, the tint adjustment screen 450 does not display the "partial selection key" 452.

If the user selects the "Want to clarify a difference among three types of tints of the bar graphs (a)" 442 on the adjustment selection screen 440, the user selects bar graphs seen in similar colors, which are difficult to distinguish, using the "partial selection key" 452 of the tint adjustment screen 450. For example, after selecting a graph A and a graph B, colors of which are difficult for the user to distinguish, and if the user selects the "Display Preview" 453, the "Preview Pattern" 454 in which tints of the graph A and the graph B are changed from those of the "Original Image (not processed)" 451 is displayed on the tint adjustment screen 450.

If the user selects the "Want to clarify a different between tints of the female and the male of the mark of the powder room (b)" 443 on the adjustment selection screen 440, and if the user selects the "Display Preview" 453 on the tint adjustment screen 450, the "Preview Pattern" 454 in which tints of a female and a male of the mark of a powder room are changed from those of the "Original Image (not processed)" 451 is displayed on the tint adjustment screen 450.

If the user selects the "Want to clarify a difference between the racket and the background of the mark of the tennis racket (c)" 444 on the adjustment selection screen 440, and if the user selects the "Display Preview" 453 on the tint adjustment screen 450, the "Preview Pattern" 454 in which tints of a racket and the background of the mark of a tennis racket are changed from those of the "Original Image (not processed)" 451 is displayed on the tint adjustment screen 450.

If the "Preview Pattern" 454 is an image corresponding to the color sense characteristics or the taste of the user, the user selects the "Complete Adjustment (Print)" 457 (Yes in ACT 186). The MFP 100 outputs a preview toner image and the display screen displays the determination screen 430 shown in FIG. 7 (ACT 174).

Figure 10:
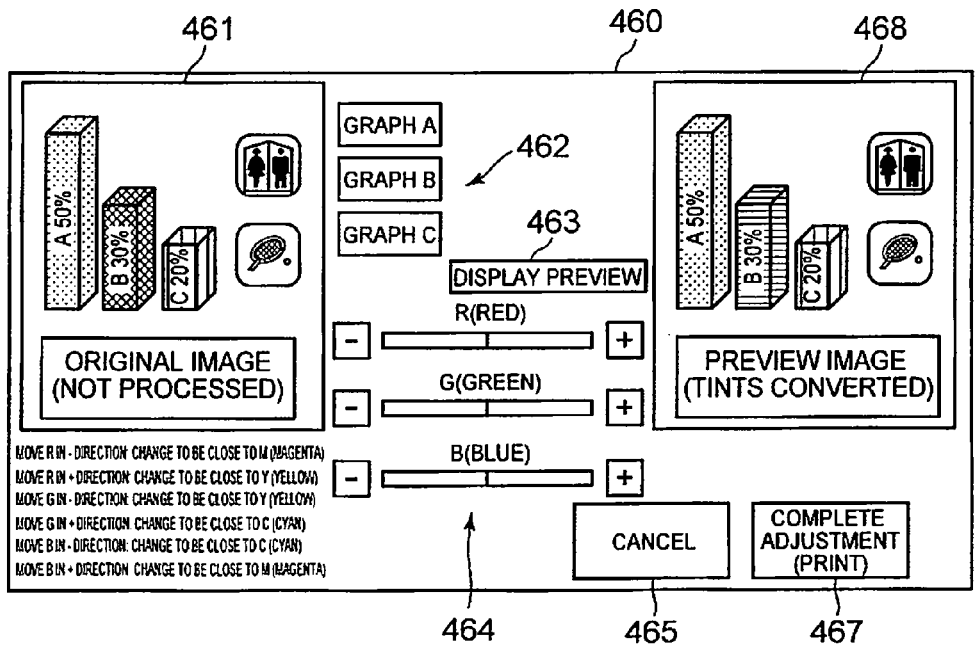
FIG. 10 is a diagram for explaining a detailed adjustment screen (of the display screen) according to the first embodiment.

If the "Preview Pattern" 454 is not an image corresponding to the color sense characteristics or the taste of the user (No in ACT 186), and if the user desires a more detailed color change, the user selects the "Detailed Adjustment" 456 (Yes in ACT 187). The display screen displays a detailed adjustment screen 460 shown in FIG. 10 (ACT 188).

If the "Preview Pattern" 454 is not an image corresponding to the color sense characteristics or the taste of the user (No in ACT 186), and if the user cancels the printing, the user selects "Cancel" 455 (No in Act 187). The MFP 100 proceeds to ACT 191 according to the selection of the "Cancel" 455.

The detailed adjustment screen 460 displays "Original Image (not processed)" 461, "partial selection key" 462, "Display Preview" 463, "adjustment scale" 464, "Cancel" 465, "Complete Adjustment (Print)" 467, and "Preview Pattern" 468. If the user selects the "Want to clarify a different between tints of the female and the male of the mark of the powder room (b)" 443 or the "Want to clarify a difference between the racket and the background of the mark of the tennis racket (c)" 444 on the adjustment selection screen 440, the detailed adjustment screen 460 changed from the tint adjustment screen 450 does not display the "partial selection key" 462.

For example, if the user selects the graph A in the "partial selection key" 462 of the detailed adjustment screen 460 and selects the "Display Preview" 463, the "Preview Pattern" 468 in which a tint of the graph A is changed from that of the "Original Image (not processed)" 461 is displayed on the detailed adjustment screen 460. The change of the tint of the graph A is performed by operating the "adjustment scale" 464.

If the user operates (−) of R (Red) of the "adjustment scale" 464, the tint of the graph A changes to be close to M (Magenta). If the user operates (+) of R (Red) of the "adjustment scale" 464, the tint of the graph A changes to be close to Y (Yellow). If the user operates (−) of G (Green) of the "adjustment scale" 464, the tint of the graph A changes to be close to Y (Yellow). If the user operates (+) of G (Green) of the "adjustment scale" 464, the tint of the graph A changes to be close to C (Cyan). If the user operates (−) of B (Blue) of the "adjustment scale" 464, the tint of the graph A changes to be close to C (Cyan). If the user operates (+) of B (Blue) of the "adjustment scale" 464, the tint of the graph A changes to be close to M (Magenta).

The user operates the "adjustment scale" 464 to obtain an image corresponding to the color sense characteristics or the taste while checking patterns having different tints in the "Preview Pattern" 468.

If the "Preview Pattern" 468 is an image corresponding to the color sense characteristics or the taste of the user, the user selects the "Complete Adjustment (Print)" 467 (Yes in ACT 189). The MFP 100 outputs a preview toner image. The display screen displays the determination screen 430 shown in FIG. 7 (ACT 174).

If the "Preview Pattern" 468 is not an image corresponding to the color sense characteristics or the taste of the user, the user selects the "Cancel" 465 (No in ACT 189). The MFP 100 proceeds to ACT 191 according to the selection of the "Cancel" 465.

The user may print preview toner images of plural patterns in the MFP 100, directly see and check plural prints, and select image processing corresponding to the color sense characteristics or the taste of the user rather than checking plural patterns having different tints in the "Preview Pattern" 468 of the detailed adjustment screen 460.

According to the first embodiment, it is possible to select, using the display screen, tints of patterns corresponding to color sense characteristics or tastes of respective users and adjust tints of color images. It is possible to easily provide color images easy to see for the users according to the color sense characteristics or the tastes of the respective users. According to the first embodiment, after storing a user-only pattern having a tint easy to see for a user selected by the user in the memory in association with a user ID, if necessary, the user is authenticated and calls the user-only pattern stored in the memory. The user can easily provide a color image easy to see simply by calling the user-only pattern when the user forms a color image. The user can save labor and time for selecting a pattern having a tint easy to see and adjust a tint of a color image every time the user forms an image.

Second Embodiment

A second embodiment is explained. The second embodiment is different from the first embodiment in a pattern displayed on a selection screen. In the second embodiment, components same as the components explained in the first embodiment are denoted by the same reference numerals and signs and detailed explanation of the components is omitted.

Figure 12:
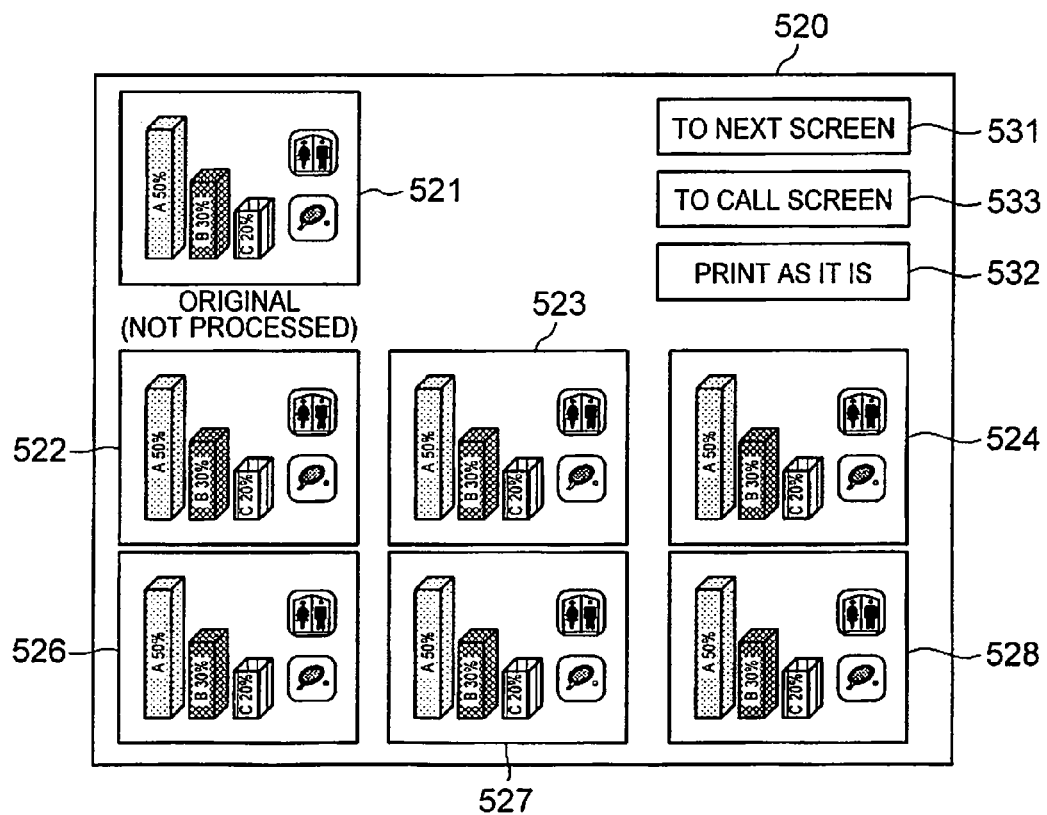
FIG. 12 is a diagram for explaining a selection screen (of the display screen) according to a second embodiment.

In the second embodiment, as shown in FIG. 12, all patterns having different tints are displayed on a selection screen 520 as a list. The selection screen 520 displays all patterns, for example, "Original (not processed)" 521, "patterns having tints easy to see for the people having a high degree of color weakness of the P type color weakness people, the D type color weakness people, and the T type color weakness people" 522 to 524, and "patterns having tints easy to see for the people having a low degree of color weakness of the P type color weakness people, the D type color weakness people, and the T type color weakness people" 526 to 528. The selection screen 520 displays "To Next Screen" 531 for transitioning to the next screen, "Print as it is" 532 for printing without necessity of tint adjustment, and "To Call Screen" 533 for calling a user-only pattern stored in the setting-information storing section 112b or an external storing section.

Figure 13:
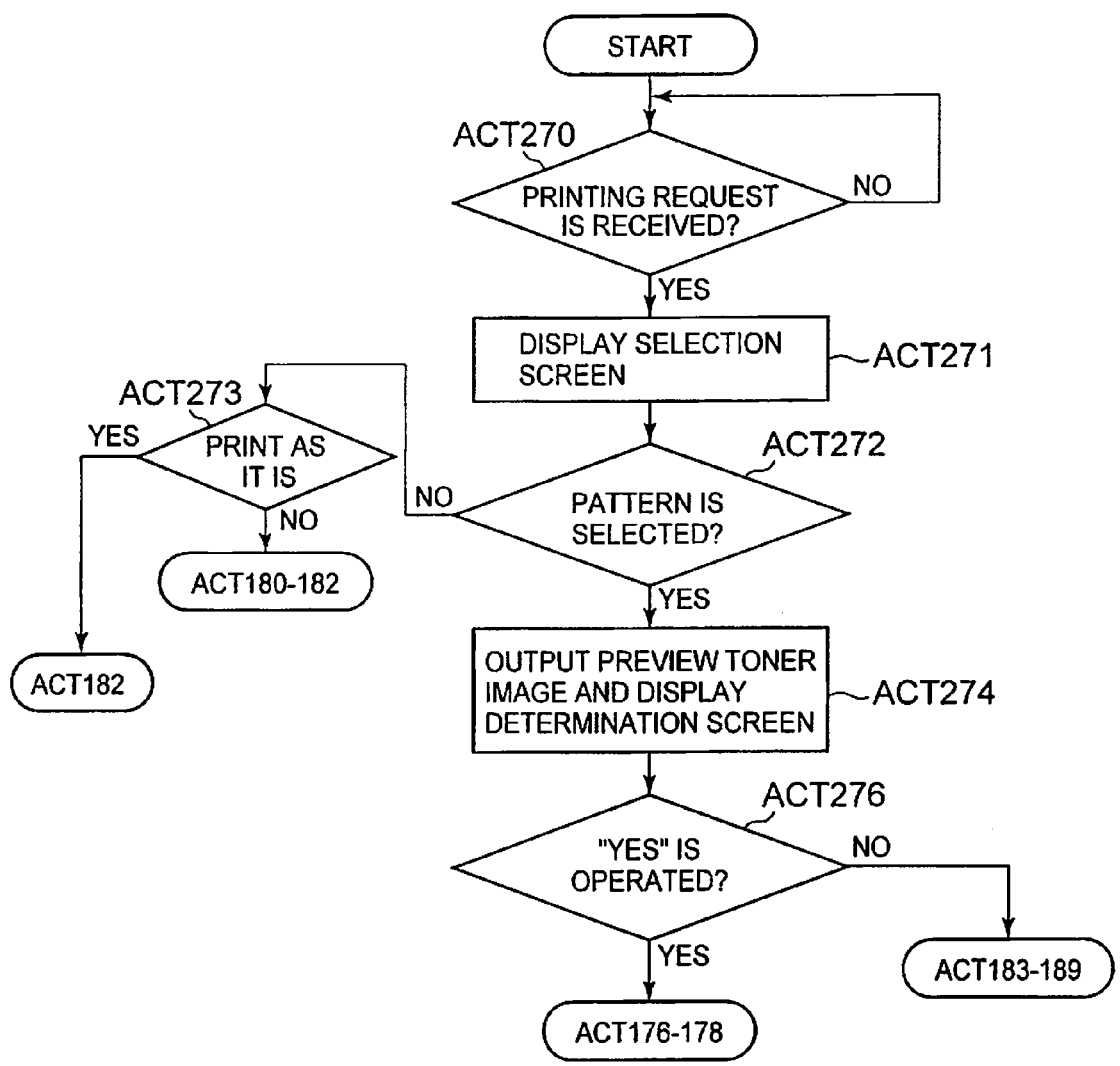
FIG. 13 is a flowchart for explaining image processing before execution of printing according to the second embodiment.

As shown in FIG. 13, if a printing request is received from the control panel 120, the client PC 200, or the like (Yes in ACT 270), the MFP 100 displays the selection screen 520 on the display screen (ACT 271).

If a user already stores a pattern having a tint matching color sense characteristics or a taste of the user in the setting-information storing section 112b or the external storing section, the user selects the "To Call Screen" 533 (No in ACT 272 and No in ACT 273). If the user selects the "To Call Screen" 533, the MFP 100 proceeds to ACTS 180 to 182 in FIG. 4, applies image processing based on the user-only pattern to a job requested to be printed, and performs print processing.

If the user does not store a pattern having a tint matching the color sense characteristics or the state of the user and if tint adjustment is unnecessary, the user selects the "Print as it is" 532 (Yes in ACT 273). The MFP 100 proceeds to ACT 182 in FIG. 4, directly applies the print processing to the job requested to be printed without performing tint adjustment, and ends printing operation.

If the user selects any pattern easy to see for the user from the list of all patterns 521, 522 to 524, and 526 to 528 displayed on the selection screen 520 (Yes in ACT 272), the MFP 100 outputs a preview toner image of a tint of the selected pattern. The display screen displays the determination screen 430 shown in FIG. 7 (ACT 274).

If the user determines that the preview toner image has a tint assumed by the user and operates the "Yes" 431 of the determination screen 430 (Yes in ACT 276), the MFP 100 proceeds to ACTS 176 to 178 in FIG. 4, applies image processing based on the tint of the type selected by the user to a job requested to be printed, and performs print processing.

If the preview toner image output in ACT 274 is different from the tint assumed by the user and the user operates the "No" 432 of the determination screen 430 (No in ACT 276), the MFP 100 proceeds to ACTS 183 to 189 in FIG. 4 for further adjustment of the tint corresponding to the color sense characteristics or the taste of the user.

According to the second embodiment, as in the first embodiment, it is possible to easily provide, using the display screen, color images easy to see for users according to color sense characteristics or tastes of the respective users. By storing a user-only pattern in the memory in association with a user ID, when the user forms a color image, the user can easily provide a color image easy to see simply by calling the user-only pattern without consuming labor and time for selecting a pattern having a tint easy to see and adjusting a tint of a color image. According to the second embodiment, since all patterns having different tints are displayed on the selection screen as a list, the user can check and select a color image easy to see for the user in the list. The user can easily select a pattern having a tint easy to see for the user.

According to at least one of the embodiments, it is possible to easily provide, using the display screen, color images easy to see for users corresponding to color sense characteristics or tastes of the respective users. A user can easily provide, using a user-only pattern, a color image easy to see for the user without consuming labor and time for selecting a pattern having a tint easy to see for the user.

While certain embodiments have been described these embodiments have been presented by way of example only, and are not intended to limit the scope of the inventions. Indeed, the novel apparatus and methods described herein may be embodied in a variety of other forms; furthermore various omissions, substitutions and changes in the form of the apparatus and methods described herein may be made without departing from the spirit of the inventions. The accompanying claims and their equivalents are intended to cover such forms of modifications as would fall within the scope and spirit of the invention.

What is claimed is:

1. An image forming apparatus comprising:
   a display section configured to display plural patterns, each having a same shape and different color tints on a same screen, the same shape including different figures;
   a selecting section configured to accept from a user a selection of a pattern having a color tint that is easy to see for the user according to the user's color sense characteristics from the plural patterns displayed on the display section;
   a determining section configured to accept from the user an input indicating whether the pattern selected with the selecting section is suitable; and
   a control section to set, based on the input the determining section, a color tint of a toner image formed by an image forming section.

2. The apparatus according to claim 1, wherein the display section displays a list of all patterns having a same shape and different color tints on the same screen.

3. The apparatus according to claim 1, wherein the display section displays only a part of all patterns having a same shape and different color tints on the same screen.

4. The apparatus according to claim 3, wherein, if the user inputs, to the determining section, a determination that the desired pattern is unsuitable, the display device displays a next part of all the patterns.

5. The apparatus according to claim 1, wherein the image forming section forms a preview toner image of the desired pattern selected by the user in the selecting section.

6. The apparatus according to claim 1, further comprising an adjusting section configured to accept an input adjustment of a color tint of the selected desired pattern if the user inputs, to the determining section, a determination that the selected desired pattern is unsuitable.

7. The apparatus according to claim 6, wherein the display section displays a preview pattern of the adjusted pattern input by the adjusting section.

8. The apparatus according to claim 1, further comprising a memory to store, in association with an identification of the user, a user-specific pattern indicated as a suitable pattern by the user in the determining section.

9. The apparatus according to claim 8, further comprising a calling section to call the user-specific pattern stored by the memory.

10. The apparatus according to claim 9, wherein, if the calling section identifies the user, the calling section calls the user-specific pattern stored by the memory.

11. The apparatus according to claim 9, wherein the control section sets, according to the user-specific pattern called by the calling section, the color tint of the toner image formed by the image forming section.

12. An image control method comprising:
    displaying plural patterns, each having a same shape and different color tints on a same screen, the same shape including different -figures;
    accepting selection of a pattern having a color tint that is easy to see for the user according to the user's color sense characteristics from the plural patterns displayed on the same screen;
    accepting from the user an input indicating whether the selected pattern is suitable; and
    forming a toner image with a color tint of the pattern indicated by the user as suitable.

13. The method according to claim 12, wherein the plural patterns displayed on the same screen are a list of all patterns having a same shape and different color tints.

14. The method according to claim 12, wherein the plural patterns displayed on the same screen are only a part of all patterns having a same shape and different tints.

15. The method according to claim 14, further comprising displaying, if the user inputs a determination that the desired pattern is unsuitable, a next part of remaining patterns on the same screen.

16. The method according to claim 12, further comprising forming a preview toner image of the desired pattern selected by the user.

17. The method according to claim 12, further comprising accepting an input from the user adjusting a color tint of the selected desired pattern.

18. The method according to claim 17, further comprising displaying a preview pattern of the adjusted pattern.

19. The method according to claim 12, further comprising storing, in association with an identification of the user, a user-specific pattern indicated as a suitable pattern by the user in the determining section.

20. The method according to claim 19, further comprising:
    identifying the user; and
    calling the user-specific pattern stored in association with the identification of the user.

* * * * *